April 1, 1969 L. D. POWNER 3,436,754

BINARY TO INTERNATIONAL MORSE CODE CONVERTER

Filed June 2, 1965 Sheet 1 of 6

INVENTOR.

BY Larry D. Powner,

H. W. Loscke Att'ys.

BINARY TO INTERNATIONAL MORSE CODE CONVERTER

Filed June 2, 1965 Sheet 2 of 6

INVENTOR.
Larry D. Powner,
BY H. H. Losche
Att'ys.

INVENTOR.
Larry D. Powner,
BY H. H. Losche
Att'ys.

INVENTOR.
BY Larry D. Powner,
H. H. Loeche
Att'ys.

SCHMITT TRIGGER
A27

SHIFT REGISTERS
A4, A12, A16

SCHMITT INHIBITOR MV
A2, A11, A15

INVENTOR.
Larry D. Powner,
BY
H. H. Losche
Att'ys.

SHIFT REGISTERS
A5, A6, A17–A23

SHIFT END MV
A7, A24

PULSE STEERING MV
A8, A25

INVENTOR.
Larry D. Powner,
BY
H. W. Losche
Att'ys.

United States Patent Office
3,436,754
Patented Apr. 1, 1969

3,436,754

BINARY TO INTERNATIONAL MORSE CODE CONVERTER

Larry D. Powner, Indianapolis, Ind., assignor to the United States of America as represented by the Secretary of the Navy Filed June 2, 1965, Ser. No. 460,603
Int. Cl. H04l 3/00; H03k 13/00; G08c 9/00
U.S. Cl. 340—347 9 Claims

ABSTRACT OF THE DISCLOSURE

A binary to international Morse code converter having a plurality of condition sensing means providing analog voltages of the sensed conditions which analog voltages are matched in a resistance ladder and converted to binary values that are placed in a shift register and readout sequentially in Morse code, each with Morse code identification, until all condition sensing means are transmitted by radio link for remote reception.

BACKGROUND OF THE INVENTION

This invention relates to Morse code radio signal transmission systems and more particularly to a means of converting an analog voltage from each of a plurality of condition measuring instruments into digital or binary signals that are sequenced in radio transmission in Morse code, each condition measuring instrument information word being provided a Morse code identification for remote reception of a readout of all condition measuring instruments.

Prior known means of converting analog voltage information from condition measuring instruments to Morse code for transmission to remote areas by radio link usually included many electromechanical devices such as stepping switches, rotary relays, and/or code wheels. These devices required many adjustments for contact tensions, used special lubrication for various environments, provided high speed operation with mechanical deterioration, and needed excessive power requirements for motors and solenoids. The speed of operation was limited by the movements of gear trains and solenoid movements to change stepping switch positions. To get information, sixteen different Morse code letters were used in combination of two letters to make a total message format of $16\times16=256$ pieces of information.

SUMMARY OF THE INVENTION

In the present invention a solid state system is used to convert analog voltage into digital or binary format with timing circuits to read out the binary information to be radio transmitted in Morse code. One example of use is in a remote, unattended weather station which transmits weather information, such as wind velocity, barometric pressure, temperature, wind direction, etc. A programmer controlled by a master timer is used to present analog voltage information to the solid state digital computer and logic system for transmission by radio link to remote receivers. Each type of information sensed, as a temperature measuring sensor, must be identified by its own signature signal together with the information on temperature. The sensor identification is transmitted in Morse code represented by one letter provided by three binary bits followed by Morse code of four letters providing the sensor information, although Morse code letters and numbers represented by one or more binary bits, or for a combination of letters or numbers, may be used for sensor identification where a large number of information signals are to be transmitted. The sensor information is provided by combining two binary bits of information to a letter, using the letters M, N, I, and A, which only require two bits, such as the characters – – for M, – · for N, · · for I, and · – for A. These letters can be used in 256 different combinations to provide the same number of pieces of information. Where more than 256 combinations are needed for transmitting and receiving increased information, three or more binary bits may be used to represent other Morse code letters or numbers. The solid state logic of this system places a space between the characters of each letter pair equal in time to a Morse code dot (·) and places a space between pairs of letters equal in time to a Morse code dash (–). The logic system also separates the sensor identification letter from the sensor information by a space equal in time to a Morse code dash. In the conversion of the binary format to Morse code the binary "0" equals a dash (–) and the binary "1" equals a dot (·) with the time interval of radio transmission of a dash (–) being three times the transmission time of a (·). It is therefore a general object of this invention to provide a solid state analog voltage-to digital or binary voltage-to Morse code converter for transmitting messages by radio link to remote receivers of several different sensor instruments, each sensor provided information message being identified by a Morse code signature signal.

BRIEF DESCRIPTION OF THE DRAWINGS

These and other objects and the attendant advantages, features, and uses will become more apparent to those skilled in the art as a detailed description of the several figures proceeds in which.

DESCRIPTION OF THE PREFERRED EMBODIMENT

Figure 1:
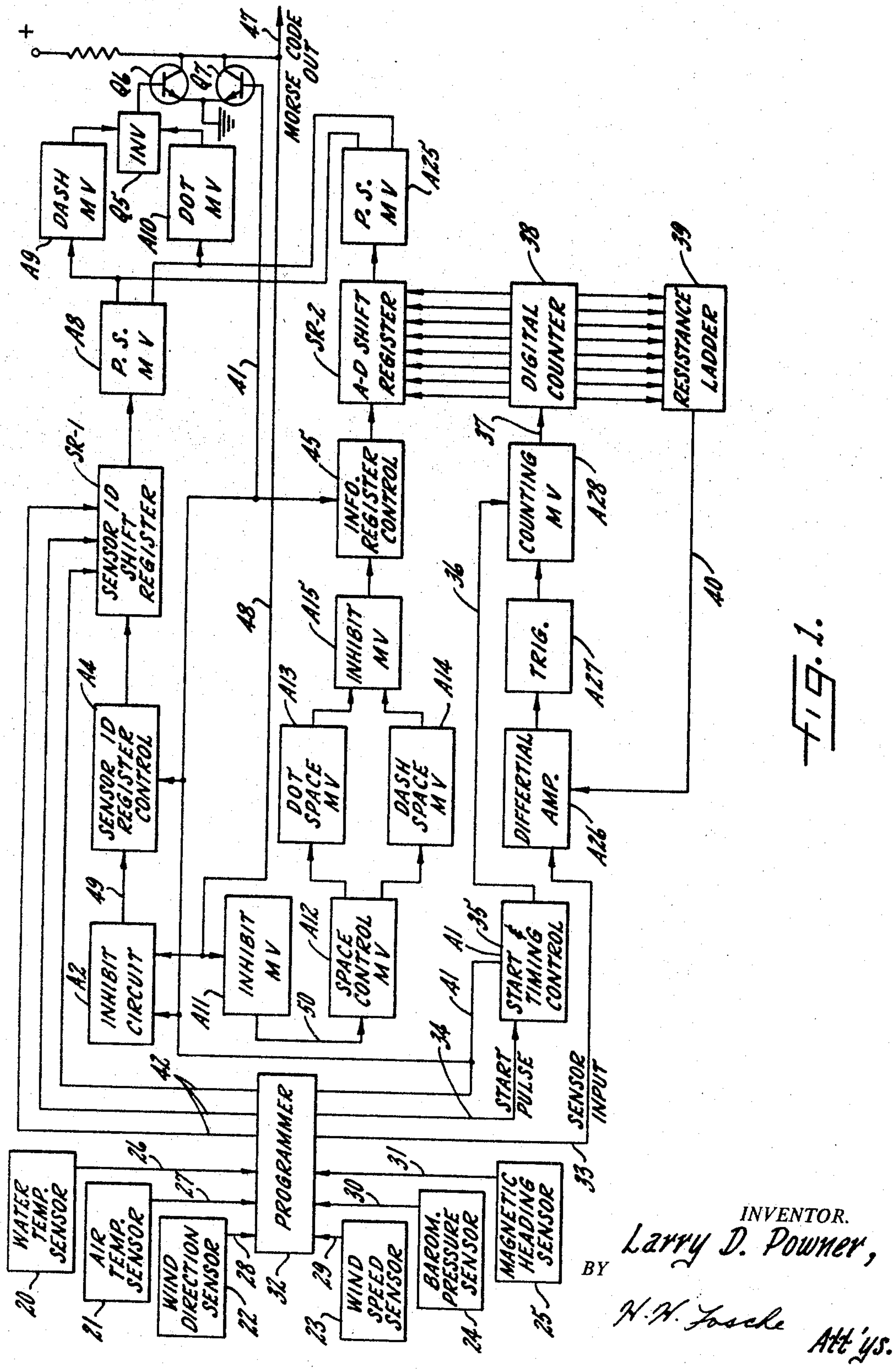
FIGURE 1 is a block diagram of the invention illustrating the direction of information in a general operational organization.

*Figure 1*

Referring more particularly to FIGURE 1, the general organization of the invention is shown in block form with information passing in the direction shown by the arrows for the purpose of providing a general combination of the invention with the results to be obtained, illustrated as obtaining weather information for remote transmission purely for the purpose of example and not in any way to limit the invention. If the organization of the invention illustrated in FIGURE 1 is used as a weather station, the components will be incorporated in a unit for remote placement in areas on land or on the sea and unattended in its operation. Such a weather station includes condition measuring sensors, such as a water temperature sensor 20, an air temperature sensor 21, a wind direction sensor 22, a wind speed sensor 23, a barometric pressure sensor 24, and a magnetic heading sensor 25, each of which develop an analog voltage of an amplitude directly proportional to the condition measured. These six sensors have corresponding output leads 26 through 31 leading into a programmer 32. The programmer 32 may be any well-known means of setting up switching circuits, such as a step switching means, controlled by a master timer (not shown) within the programmer. The programmer 32 switches the analog voltage information of each of the condition measuring sensors 20 through 25 in sequence on an output 33 which is connected as a sensor input to a differential amplifier module A26. The programmer, upon being initially started through its sequence of sampling from the condition measuring means, produces a negative start pulse on an output 34 which is applied to a start and timing control circuit 35. The start and timing control circuit 35 is operative in time for about 300 milliseconds (m.s.) and for this length of time produces on an output 36 a bias voltage to a counting free-running multivibrator module A28 to produce pulses on its output 37 to a digital counter 38. The digital counter 38 is an eight-bit counter, the purpose of which will be made clear in the description of FIGURES 2*a* and 2*b*, the count of these eight bits being accumulated in a progressive manner as the count increases to a resistance ladder 39. The resistance ladder is such that as the count from the digital counter 38 increases, the voltage output 40 from the resistance ladder 39, applied as a second input to the differential amplifier, will continue until the analog voltage from the resistance ladder equals the analog voltage from the sensor input 33. When these two voltages become equal, the differential amplifier A26 will trigger a trigger multivibrator module A27 coupled to the counting multivibrator module A28 to interrupt its free-running operation. The count which is in the digital counter 38 thereby becomes a binary number up to eight bits representative of the analog voltage of the condition measuring sensor selected, such as the water temperature sensor for example.

At the same time that the starting pulse over the output 34 from programmer 32 sets the start and timing control circuit 35 on its 300 m.s. operation, output 41 from the start and timing control circuit 35 is applied to the programmer to establish the signature of the condition measuring sensor. This signature is coupled into the switching means of the programmer 32 to correspond with the condition measuring sensor selected, such as the water temperature sensor 20, and produces a binary output over the output conductors 42 to a sensor identification shift register SR–1 setting this binary signature into this register. This signature consists of a binary word of three binary bits which bits are entered into the three stages of the shift register SR–1 to provide a binary word for readout of a Morse code letter identified by three bits in dots and dashes. At the same time, the output 41 from the start and timing control circuit 35 is applied to a sensor identification register control circuit module A4 which sets the shift register SR–1 to receive the signature identification of the sensor but to present register readout. This same 300 m.s. pulse is also applied to an information register control circuit 45 which controls an analog-to-digital shift register SR–2 to allow the digital counter 38 to place or dump its count into the register SR–2 and to prevent readout of this register until the readout of SR–1 is completed. The 300 m.s. pulse on the output 41 is also coupled to the base of a transistor Q7, the emitter of which is grounded and the collector of which is coupled to a voltage source through a collector load resistor and from which collector the Morse code output is taken on output conductor 47. The output conductor 47 may be connected to the keying circuit of a radio transmitter to transmit the Morse code. As long as the 300 m.s. pulse is applied to the base of transistor Q7, the output 47 will remain substantially at 0 voltage.

When the start and timing control circuit 35 reaches the end of its timing operation, the trailing edge of the 300 m.s. pulse will be effective by way of the output conductor means 41 to the programmer 32 cutting off the output 42 of the signature binary information, will remove the biasing voltage on the base of transistor Q7, and will remove the voltage on the sensor identification register control A4 to allow the sensor identification shift register SR–1 to begin its serial readout. The readout from the sensor identification shift register SR–1 is to a pulse steering multivibrator A8 which, upon receiving a binary "0" will direct this binary "0" by way of a conductor means to a dash multivibrator module A9 which is timed to produce an output signal three times the time interval of a dot signal produced by a dot multivibrator A10. The output dash pulse from A9 is inverted in an inverter Q5 and applied to the base of a transistor Q6 to block conduction in transistor Q6 thereby producing a voltage pulse on the output 47 equal in time to the dash pulse produced by A9. Whenever a binary "1" is read out of the sensor identification shift register SR–1, the pulse steering multivibrator A8 will direct this pulse to the dot multivibrator A10 to produce an output voltage through the inverter Q5 to block conduction of transistor Q6 for the length of time that the dot multivibrator A10 is operative, being one-third the time interval produced by the dash multivibrator A9. The output 47, coupled by a feedback conductor 48 to an inhibit multivibrator A2 having an output 49 coupled to the sensor identification register control A4, causes the sensor identification shift register SR–1 to produce a space in the readout of the three binary bits equal to a dot in time duration. The Morse code output from 47 over the feedback circuit 48 is also applied to an inhibit multivibrator A11 coupled by way of the conductor means 50 to a space control multivibrator A12.

After the three binary bits are read out over the output conductor 47 in Morse code, the inhibit multivibrator A11 is triggered to place the space control multivibrator A12 into operation and readout of the analog to digital shift register SR–2 begins. The pulse steering multivibrator A25 receiving the binary bits serially from the shift register SR–2 directs the binary "0" bits to the dash multivibrator A9 and the binary "1" bits from the shift register SR–2 to the dot multivibrator A10 in the same manner as readout by the sensor identification shift register SR–1. The first binary digital bit readout, whether it is a dash or a dot, will be effective through the feedback circuit 48, inhibit multivibrator A11, and conductor 50 to the space control multivibrator A12 to activate a dot space multivibrator module A13. The output of the multivibrator A13 is applied to an inhibit multivibrator A15, the output of which is to the information register control 45 to stop readout of the shift register SR–2 for a period of time equal to a dot. The next serially readout binary number, whether a dot or a dash, will cause the trailing edge through the feedback circuit 48, A11, 50 and A12, to activate a dash space multivibrator A14 having its output coupled to the inhibit multivibrator A15 through the information register control circuit 45 to block readout of the shift register SR–2 for a period of time equal to a dash. Thus the space control multivibrator A12 will activate the dot space multivibrator A13 and the dash space multivibrator A14 alternately to produce a dot and dash alternately between the bits serially read out of the shift register SR–2. By this means the eight bits of binary information in the shift register SR–2 will be read out in dot and dash pairs of Morse code on the output 47, each pair of Morse code signals corresponding to two binary bits being separated by a dot space and each pair of Morse code signals corresponding to each pair of binary bits being separated by a dash signal. In this manner the Morse code pairs produced directly from the digital readout of the shift register SR–2 of eight bits produce the Morse code letters M, N, I, and A. The readout of these Morse code letters M, N, I, and A, in all combinations is capable of producing 256 bits of information in accordance with the code conversion chart as follows:

CODE CONVERSION CHART

| | | | | |
|---|---|---|---|---|
| MMMMM=0 | MIMI=51 | NANA=102 | ANAN=153 | IMIM=204 |
| MMMN=1 | MINM=52 | NANI=103 | ANAA=154 | IMIN=205 |
| MMMA=2 | MINN=53 | NAAM=104 | ANAI=155 | IMIA=206 |
| MMMI=3 | MINA=54 | NAAN=105 | ANIM=156 | IMII=207 |
| MMNM=4 | MINI=55 | NAAA=106 | ANIN=157 | INMM=208 |
| MMNN=5 | MIAM=56 | NAAI=107 | ANIA=158 | INMN=209 |
| MMNA=6 | MIAN=57 | NAIM=108 | ANII=159 | INMA=210 |
| MMNI=7 | MIAA=58 | NAIN=109 | AAMM=160 | INMI=211 |
| MMAM=8 | MIAI=59 | NAIA=110 | AAMN=161 | INNM=212 |
| MMAN=9 | MIIM=60 | NAII=111 | AAMA=162 | INNN=213 |
| MMAA=10 | MIIN=61 | NIMM=112 | AAMI=163 | INNA=214 |
| MMAI=11 | MIIA=62 | NIMN=113 | AANM=164 | INNI=215 |
| MMIM=12 | MIII=63 | NIMA=114 | AANN=165 | INAM=216 |
| MMIN=13 | NMMM=64 | NIMI=115 | AANA=166 | INAN=217 |
| MMIA=14 | NMMN=65 | NINM=116 | AANI=167 | INAA=218 |
| MMII=15 | NMMA=66 | NINN=117 | AAAM=168 | INAI=219 |
| MNMM=16 | NMMI=67 | NINA=118 | AAAN=169 | INIM=220 |
| MNMN=17 | NMNM=68 | NINI=119 | AAAA=170 | ININ=221 |
| MNMA=18 | NMNN=69 | NIAM=120 | AAAI=171 | INIA=222 |
| MNMI=19 | NMNA=70 | NIAN=121 | AAIM=172 | INII=223 |
| MNNM=20 | NMNI=71 | NIAA=122 | AAIN=173 | IAMM=224 |
| MNNN=21 | NMAM=72 | NIAI=123 | AAIA=174 | IAMN=225 |
| MNNA=22 | NMAN=73 | NIIM=124 | AAII=175 | IAMA=226 |
| MNNI=23 | NMAA=74 | NIIN=125 | AIMM=176 | IAMI=227 |
| MNAM=24 | NMAI=75 | NIIA=126 | AIMN=177 | IANM=228 |
| MNAN=25 | NMIM=76 | NIII=127 | AIMA=178 | IANN=229 |
| MNAA=26 | NMIN=77 | AMMM=128 | AIMI=179 | IANA=230 |
| MNAI=27 | NMIA=78 | AMMN=129 | AINM=180 | IANI=231 |
| MNIM=28 | NMII=79 | AMMA=130 | AINN=181 | IAAM=232 |
| MNIN=29 | NNMM=80 | AMMI=131 | AINA=182 | IAAN=233 |
| MNIA=30 | NNMN=81 | AMNM=132 | AINI=183 | IAAA=234 |
| MNII=31 | NNMA=82 | AMNN=133 | AIAM=184 | IAAI=235 |
| MAMM=32 | NNMI=83 | AMNA=134 | AIAN=185 | IAIM=236 |
| MAMN=33 | NNNM=84 | AMNI=135 | AIAA=186 | IAIN=237 |
| MAMA=34 | NNNN=85 | AMAM=136 | AIAI=187 | IAIA=238 |
| MAMI=35 | NNNA=86 | AMAN=137 | AIIM=188 | IAII=239 |
| MANM=36 | NNNI=87 | AMAA=138 | AIIN=189 | IIMM=240 |
| MANN=37 | NNAM=88 | AMAI=139 | AIIA=190 | IIMN=241 |
| MANA=38 | NNAN=89 | AMIM=140 | AIII=191 | IIMA=242 |
| MANI=39 | NNAA=90 | AMIN=141 | IMMM=192 | IIMI=243 |
| MAAM=40 | NNAI=91 | AMIA=142 | IMMN=193 | IINM=244 |
| MAAN=41 | NNIM=92 | AMII=143 | IMMA=194 | IINN=245 |
| MAAA=42 | NNIN=93 | ANMM=144 | IMMI=195 | IINA=246 |
| MAAI=43 | NNIA=94 | ANMN=145 | IMNM=196 | IINI=247 |
| MAIM=44 | NNII=95 | ANMA=146 | IMNN=197 | IIAM=248 |
| MAIN=45 | NAMM=96 | ANMI=147 | IMNA=198 | IIAN=249 |
| MAIA=46 | NAMN=97 | ANNM=148 | IMNI=199 | IIAA=250 |
| MAII=47 | NAMA=98 | ANNN=149 | IMAM=200 | IIAI=251 |
| MIMM=48 | NAMI=99 | ANNA=150 | IMAN=201 | IIIM=252 |
| MIMN=49 | NANM=100 | ANNI=151 | IMAA=202 | IIIN=253 |
| MIMA=50 | NANN=101 | ANAM=152 | IMAI=203 | IIIA=254 |
| | | | | IIII=255 |

From this chart a reading of water temperature, air temperature, wind direction, wind speed, barometric pressure, magnetic heading, etc., can be determined from the Morse code transmission and reception of these Morse code signals. While the six sensors are shown and given as an example in FIGURE 1, it is to be understood that a more or less number of sensors may be utilized and also other sensing devices for measuring conditions other than weather may be used and converted from analog voltage to Morse code by the means shown in FIGURE 1. The output pulses from the Morse code output conductor 47 may be applied to the radio transmitter keying circuit, as hereinabove stated, so that the output on conductor 47 will be used in the transmitter to key transmission of these pulses as Morse code and any receiver tuned to the transmitter frequency can receive this Morse coded message. In actual practice the programmer 32 timed by a master timer, after transmitting the information from the several sensor devices 20 through 25, will cut off the power supply to the transmitter and components of this system to conserve energy until the timer again turns on the power supply to the system and starts the programmer in its sequence of reading out the various condition measuring devices. Built into the programmer is the means of switching the three binary bits or signature word for each of the condition measuring sensors which is switched in sequence with the readout of the respective sensor to produce the Morse code signature letter.

Figure 2A:
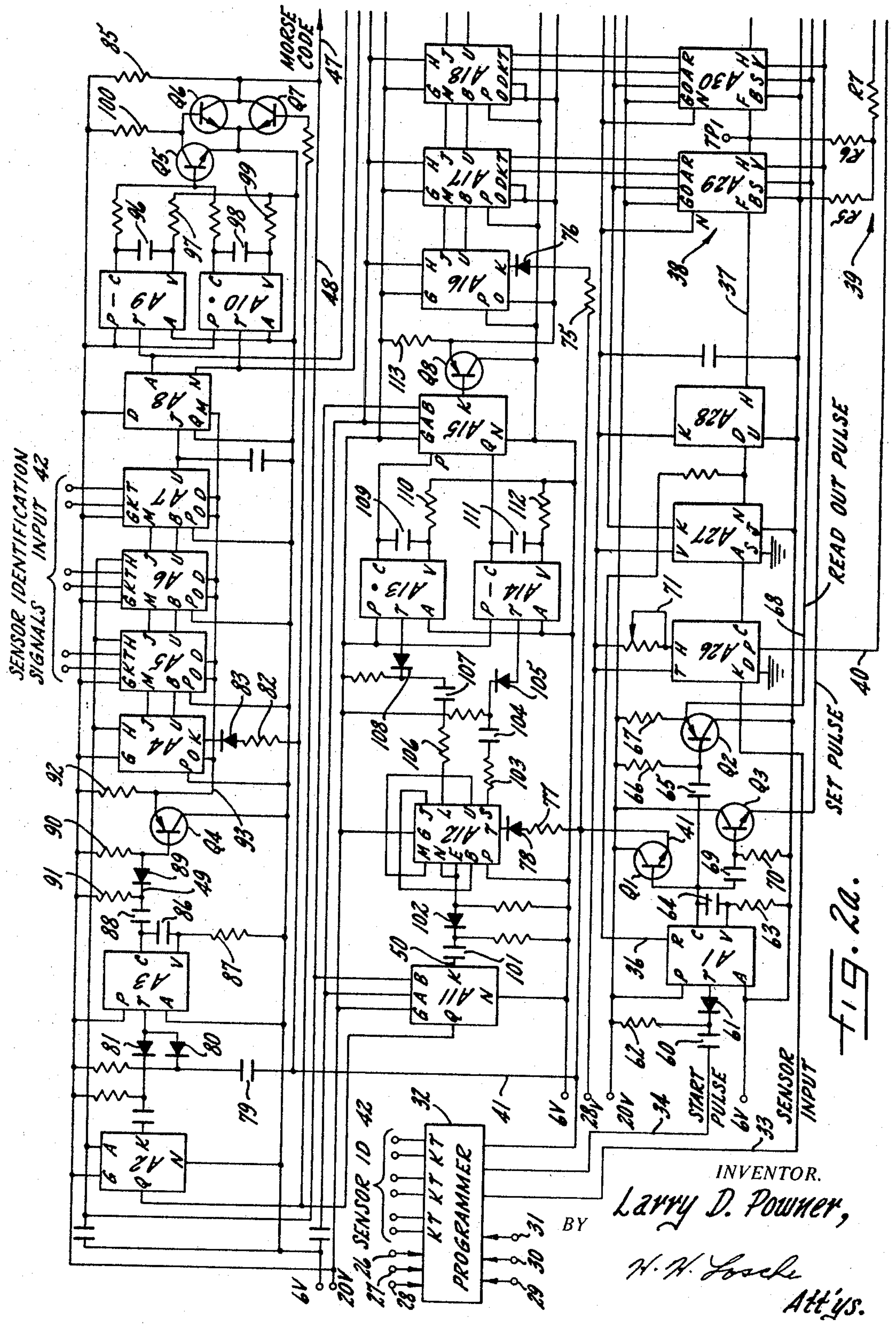
FIGURES 2*a* and 2*b* constitute a single figure of drawing divided on two pages of the drawings and illustrating a detailed block diagram of the invention shown in FIGURE 1.
Figure 2B:
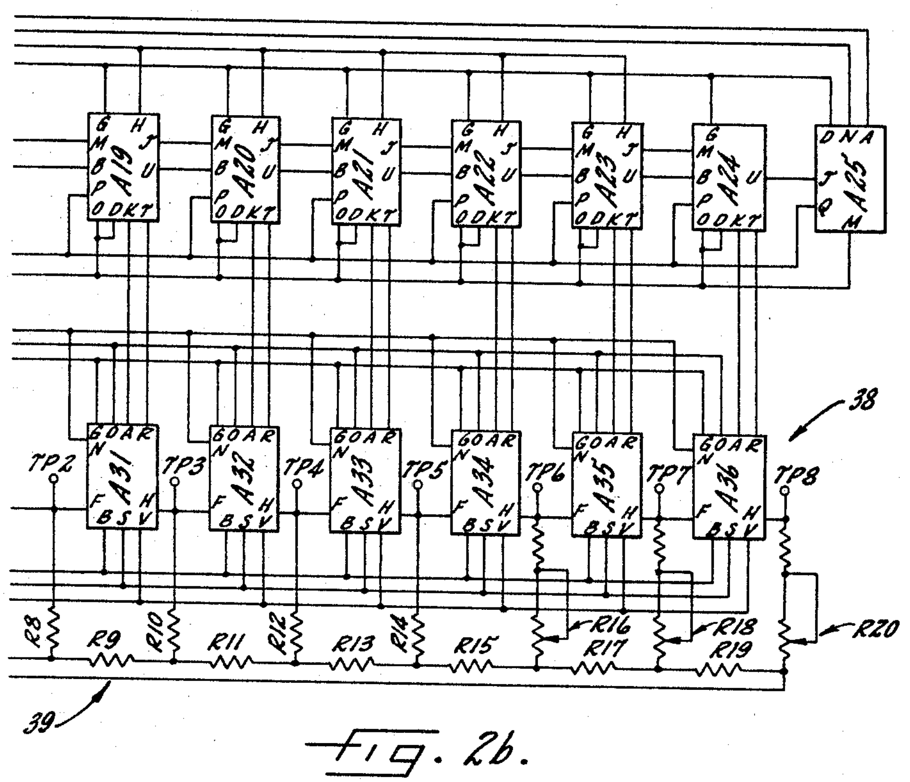

*Figures 2a and 2b*

Referring more particularly to FIGURE 2*a*, with reference to FIGURES 3 through 12 as necessary to describe the block modules A1 through A36 of FIGURES 2*a* and 2*b* illustrate in block circuit schematic wiring diagram the digital-to-binary-to Morse code converter means of this invention. FIGURES 3 through 12 illustrate various forms of multivibrators and a differential amplifier used in the blocks of FIGURES 2*a* and 2*b*. The multivibrators may be of conventional and well-known types, recognized by those skilled in the art, but are represented herein for the purpose of example with such variations therein required to produce different timing results, outputs taken at different points, to serve the purpose required in the circuit of FIGURES 2*a* and 2*b*.

Referring particularly to FIGURES 2*a* and 2*b*, when the programmer 32 initiates the start of a transmission into Morse code, a negative start pulse is applied by way of conductor 34 through a capacitor 60 and a diode 61 to terminal T of the 300 ms. one-shot multivibrator A1. The diode 61 is oriented with the cathode coupled to the capacitor 60 and this terminal between capacitor 60 and diode 61 is coupled through a resistor 62 to a 20 volt source to produce a voltage bias on terminal T of the one-shot multivibrator module A1. The 300 ms. one-shot multivibrator A1 has a terminal P coupled directly to the 20 volt source, a terminal A coupled to a 6 volt source, an output terminal C, and a terminal V coupled to the 6 volt source through a resistor 63. Terminals C and V are coupled through a capacitor 64. Terminal R of module A1 is a second output connected to a conductor means 36 connected on its opposite end as an input to the counting multivibrator A28.

Figure 3:
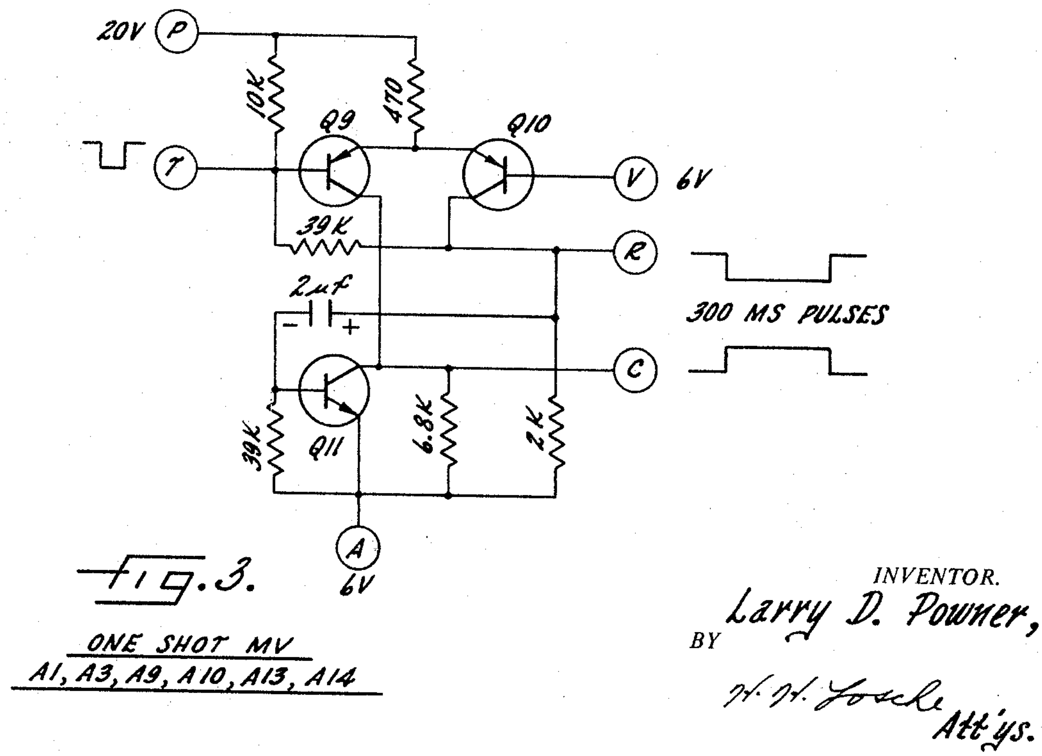
FIGURE 3 is a circuit schematic diagram of a one-shot multivibrator circuit used in several of the modules of FIGURE 2.

*Figure 3*

Referring more particularly to FIGURE 3 there is shown a one-shot multivibrator having terminals P, T, A, R, C, and V, corresponding in like manner to the terminals in the block A1 of FIGURE 2*a*. While resistor and capacitor values are shown in FIGURE 3 (as well as in FIGURES 4 through 12) for the purpose of example to provide an operative model for FIGURES 2*a* and 2*b*, these values may be changed as desired to change or modify the operational results for particular applications. The negative start pulse applied to terminal T is applied to the base of a transistor Q9 which places transistor Q9 into conduction to produce a positive pulse on the output terminal C. The time interval of this output pulse on terminal C is determined by the time constant established by the resistor 63 and capacitor 64 shown in FIGURE 2*a*. This pulse being applied to terminal V cuts off transistor Q10 to produce a negative-going 300 ms. pulse on the output terminal R. Transistor Q11 and its related circuitry provides a speedup of shaping the leading and trailing edges to produce sharp 300 ms. pulses on the outputs C and R.

Figures 4, 5, 6:
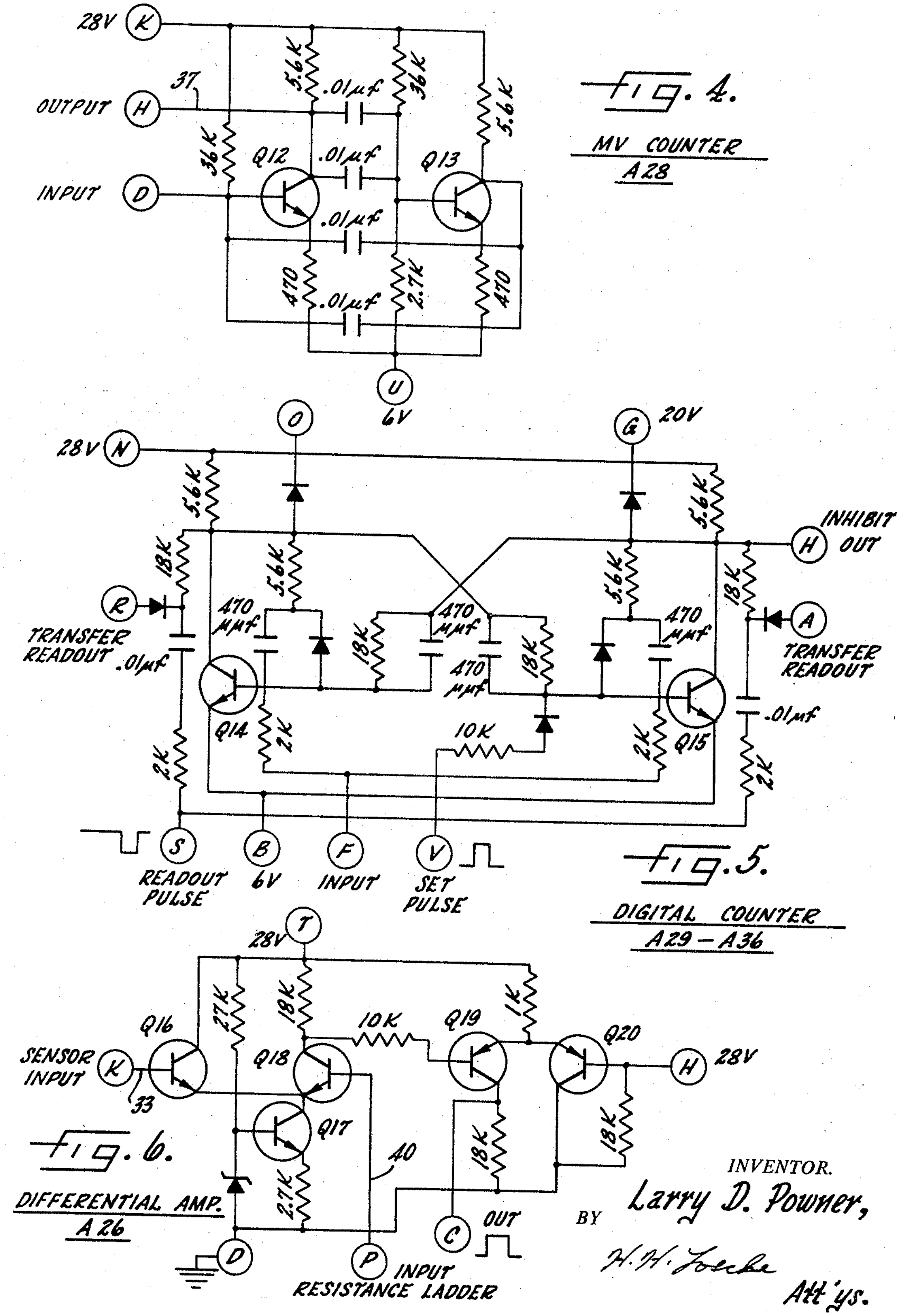
FIGURE 4 is a circuit schematic of a counting multivibrator used in FIGURE 2.
FIGURE 5 is a circuit schematic of one of the digital counter multivibrator modules shown in block in FIGURE 2.
FIGURE 6 is a circuit schematic of the differential amplifier used in FIGURE 2.

*Figure 4*

The negative-going 300 ms. pulse on the output terminal R of A1 is applied by way of the conductor 36 to the D terminal of the counter multivibrator A28. The multivibrator A28 has a terminal K coupled to a 28 volt source, a terminal U coupled to a 6 volt source, and an output terminal H. With reference to FIGURE 4, the 300 ms. negative signal from A1 applied to terminal D of module A28 is applied to the base of transistor Q12 which biases transistor Q12 in a manner to start transistors Q12 and Q13 to alternate conductive states as a free-running multivibrator. The multivibrator A28 is normally biased so that both of the transistors Q12 and Q13 are conducting, but when a negative-going 300 ms. is applied to the base of transistor Q12 the bias is lowered on the base of transistor Q12 momentarily cutting off its conduction to initially begin its free-running operation to produce pulses on the output terminal H which are applied by way of the conductor means 37 to the digital counter 38 consisting of counting multivibrators modules A29 through A36.

The output terminal H of counter multivibrator A28 is applied to terminal F by way of conductor 37 to the first digital counter module A29. The digital counter modules A29 through A36 are all constructed in the same manner and each have a terminal N coupled directly to the 28 volt source, a terminal B coupled to the 6 volt source, terminal H providing an output coupled to the input F of the next higher digital counting stage, a terminal V for setting each stage or module in its "0" binary state, a terminal S providing a readout or transfer trigger input, terminals A and R providing a "0" or "1" binary output, terminal G coupled to the 20 volt source, and a terminal O later to be described in purpose and operation. The output on terminal C of module A1 is applied through a capacitor 65 to the base of a transistor Q2 having a base bias through a resistor 66 from the 20 volt source. Transistor Q2 is a PNP type transistor having its emitter loaded through a resistor 67 to the 20 volt source and its collector coupled directly to the 6 volt source. The emitter output of transistor Q2 is coupled by conductor means 68 in parallel to all the S terminals of the digital counters A29 through A36. The output terminal C of A1 is also coupled through a capacitor 69 to the base of an NPN transistor Q3 having its collector directly coupled to the 20 volt source and its base biased from the 6 volt source through a resistor 70. The emitter output of transistor Q3 is coupled in parallel to the V terminals of the digital counters A29 through A36. When the positive 300 ms. pulse output from terminal C of A1 is applied to the base of transistor Q3, it is differentiated by 69 and 70 so that only the leading edge is applicable to apply a pulse on the emitter output to all the V terminals of A29 through A36 to set the digital counter 38 in the "0" state; that is, each counter A29 through A36 is individually set in its "0" binary state. The pulses on output 37 from counting multivibrator A28 are then added into the digital counter for a time interval of, not to exceed 300 ms.

*Figure 5*

As viewed in FIGURE 5, illustrating one of the counter modules A29–A36, the setting positive voltage signal on terminal V will place transistor Q15 into conduction, preventing conduction of transistor Q14, to produce a near zero voltage on output terminal H, placing this digital counter module in its "0" state. The first negative pulse from the multivibrator module A28 to terminal F, though applied to the bases of both Q14 and Q15, will affect Q15, since it is conducting, to cut it off and cause Q14 to go into conduction. Output H voltage will then rise providing a digital counter "1" state. The next negative pulse on terminal F will place a binary "1" on the collector of Q14 and a binary "0" on terminal H. When the trailing edge of the 300 ms. signal from the module A1 is applied to the base of transistor Q2, the capacitor 65 and resistor 66 differentiate this trailing edge to momentarily place Q2 into conduction producing a voltage drop across resistor 67 to cause a negative signal to be applied to terminals S of the digital counter modules A29 through A36. The negative readout pulse on terminals S of each digital counter module will cause each to produce a negative signal on terminals A and R, depending on the state of the digital counter module. For example, let it be assumed that the digital counter module in FIGURE 5 is in its "1" state at which time approximately 20 volts is on the output H and substantially 6 volts is on the collector of Q14. The negative readout pulse on terminal S will have no effect at terminal R since it is standing at near 6 volts. A negative pulse will be produced at terminal A since it was standing at about 20 volts and the negative readout pulse produces a momentary drop across the 18K resistor connected thereto. This negative pulse on output terminal A in FIGURE 5 is applied to the K terminal (see FIGURE 2*a*) of the shift register SR–2 to insure cutoff of conduction of Q29 (see FIGURE 10) and conduction of Q30 placing this register in a "1" state. Accordingly, the digital counter 38 transfers its count to the shift register SR–2 on a module A29 to A17—A30 to A18—A31 to A19 basis.

As the addition in the digital counter progresses, the outputs from all output terminals H of counters A29 through A36 are applied to the resistance ladder 39 consisting of resistors R5 through R20. R5 in the resistance ladder is coupled to the 6 volt source, R6 is coupled to the output terminal H of A29, R8 is coupled to the output terminal H of A30, R10 is coupled to the output terminal H of A31, etc., through R20 which is coupled to the output terminal H of A36. The resistors R16, R18, and R20 are made variable to calibrate the resistance ladder output. The terminal of resistors R19 and R20 is coupled as a feedback by way of conductor 40 to terminal P of the differential amplifier A26. The differential amplifier A26 has a sensor input terminal K coupled to the conductor 33 from the programmer 32. Terminal T of module A26 is coupled directly to the 28 volt source and terminal H is coupled through a variable resistor 71 to the 28 volt source to calibrate the sensitivity of the differential amplifier inputs K and P. The differential amplifier A26 has an output terminal C coupling the A terminal of the trigger multivibrator A27. Terminal D of module A26 is grounded. Test points TP1 through TP8 may be used for testing the operation of the digital counter prior to placement of the equipment in a remote, unmanned area.

*Figure 6*

Referring more particularly to FIGURE 6, the sensor input on conductor 33 coupled to terminal K is applied to the base of a transistor Q16 in the differential amplifier, consisting of transistors Q16 through Q20. The second input from the resistance ladder by way of conductor 40 to terminal P is applied to the base of transistor Q18. As is well known of such differential amplifier circuits, as the voltage increases on the output of the resistance ladder 39 over the conductor means 40 to terminal P, the voltage on the base of transistor Q18 will increase until it becomes equal to the voltage on the base of transistor Q16 at which time Q18 will begin conduction causing a drop in voltage on the base of Q19 placing Q19 into conduction to produce a positive-going pulse on the output terminal C. Transistor Q17 is used to speed up the leading and trailing edges produced on the output C of the differential amplifier. Output terminal C of module A26 is coupled to input terminal A of the trigger circuit module A27. The trigger circuit A27 is constructed in a manner of a Schmitt trigger having a terminal V coupled to the 28 volt source, a terminal K coupled in parallel to the O terminals of all of the digital counters A29 through A36, a J terminal coupled to the 6 volt source, an S terminal which is grounded, and an output terminal N coupled to the D terminal of the counting multivibrator A28.

Figure 7:
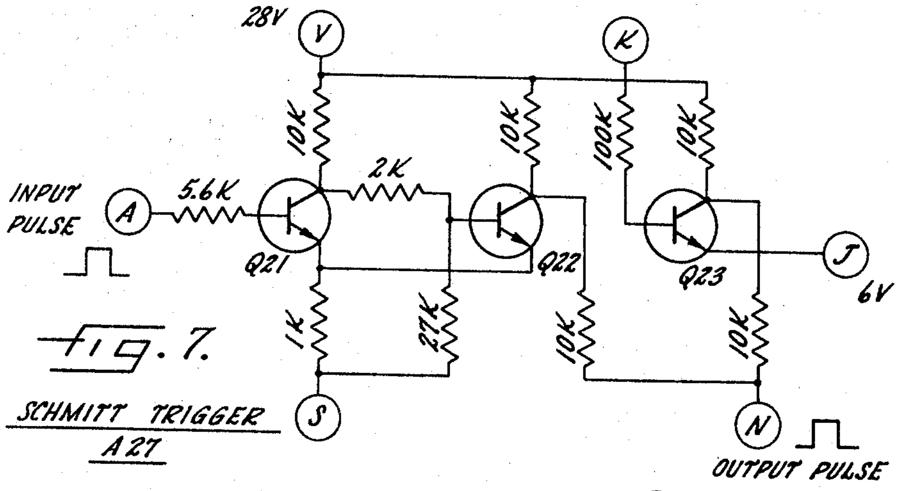
FIGURE 7 is a circuit schematic of a Schmitt trigger multivibrator circuit shown in block in FIGURE 2.

*Figure 7*

Referring more particularly to FIGURE 7, the Schmitt trigger A27 receives the positive pulse from the output terminal C of A26 on the input terminal A. The Schmitt trigger consists of transistors Q21, Q22, and Q23, in which the A terminal is coupled to the base of transistor Q21 placing this transistor into conduction upon the application of the positive pulse to cut off transistor Q22 thereby raising the collector voltage of Q22 connected to the output terminal N to produce a positive pulse which is directly applied to terminal D of the counting multivibrator 28 immediately removing the bias thereon to cut off the free-running production of multivibrator pulses. The addition of pulses from the free-running counter multivibrator A28 ceases when the voltage output from the resistance ladder equals the sensor input voltage within the 300 ms. time interval; however, if for any reason the digital counter 38 goes to full count at which time all of the O terminals produce a negative signal applicable to the K terminal of the Schmitt trigger in FIGURE 7, transistor 23 will be cut off producing a positive output on terminal N which, here again, will remove the bias on the multivibrator 28 and cause it to cease running immediately.

At the end of the 300 ms. pulse output at terminal C of A1, the trailing edge of this pulse, transistor Q2 will be rendered conductive producing a negative signal on its emitter over the conductor 68 coupled in parallel to the S terminals of the digital counter modules A29 through A36. This negative pulse on the S terminal of all counter stages will cause a readout on all the AR terminals of A29 through A36, depending on which state of "0" or "1" in which each module A29 through A36 is resting at the time the counting multivibrator A28 is cut off as described, supra. Transistor Q2 is normally nonconducting since the base is biased through resistor 66 to substantially the same voltage as its emitter, loaded through resistor 67. Accordingly, only a negative pulse, such as the trailing edge of the 300 ms. pulse will be effective to place transistor Q2 into conduction. The readout of the digital counter 38, consisting of modules A29 through A36, on terminals A and R will be applied respectively to the analog-to-digital shift register SR–2 consisting of modules A17 through A24. The one-shot 300 ms. multivibrator circuit A1 and its related circuitry of transistors Q1, Q2, and Q3, provide the start and timing control circuit 35 as shown in FIGURE 1.

Referring again to FIGURE 2*a*, at the same time that the 300 ms. one-shot multivibrator A1 is producing the 300 ms. positive pulse output on terminal C, as hereinabove described, this pulse will bias the base of transistor Q1 placing this transistor in conduction to produce a positive 300 ms. output pulse of near 20 volts on conductor means 41. This pulse is applied through the resistor 75 and a forward oriented diode 76 to terminal K of the shift register module A16 in the information register control circuit 45 of FIGURE 1. In like manner this 300 ms. pulse is applied through resistor 77 and a forward oriented diode 78 to terminal T of the shift register module A12. Conductor 41 is coupled to one plate of a capacitor 79 but the 300 ms. pulse is blocked from being applied to terminal T of a dot space module A3 by a reversely oriented diode 80. The 300 ms. pulse on conductor 41 is applied through a resistor 82 and a forward oriented diode 83 to terminal K of the shift register control module A4. This 300 ms. pulse applied to modules A4, A12, and A16, sets the module A12 so that the first pulse applied to terminal E thereof will direct an output pulse to cause the dash one-shot multivibrator module A14 to be operative, and sets the modules A4 and A16 for the proper final serial readout of the sensor identification shift register A5 through A7 and of the shift register modules A17 through A24. A branch conductor of conductor 41 is coupled to the programmer 32 to cause the sensor identification, associated with the sensor information to be dumped into the shift register A5 through A7 by way of conductors 42. The sensor identification consists of three binary bits of a "0" or a "1" associated with the output K or T of the programmer to inputs K or T of the sensor identification shift register A5 through A7 from which a single Morse code letter may be produced on the Morse code output 47.

This same 300 ms. pulse is conducted by way of the conductor means 41 to the base of transistor Q7 placing this transistor into conduction. This produces a low voltage signal on the Morse code output 47 by virtue of the voltage drop across the collector load resistor 85 which is fed back by means of the feedback conductor 48 to the Q input terminals of Schmitt inhibitor multivibrator modules A2 and A11. Inhibitor modules A2 and A11 inhibit any readout of the signal identification from the shift register A5 through A7 and also inhibit the readout of the digitalized analog voltage of the sensor voltage information now resting in the shift register A17 through A24 as long as a constant low voltage appears at terminal Q, since the outputs of these modules are through coupling capacitors.

Figure 8:
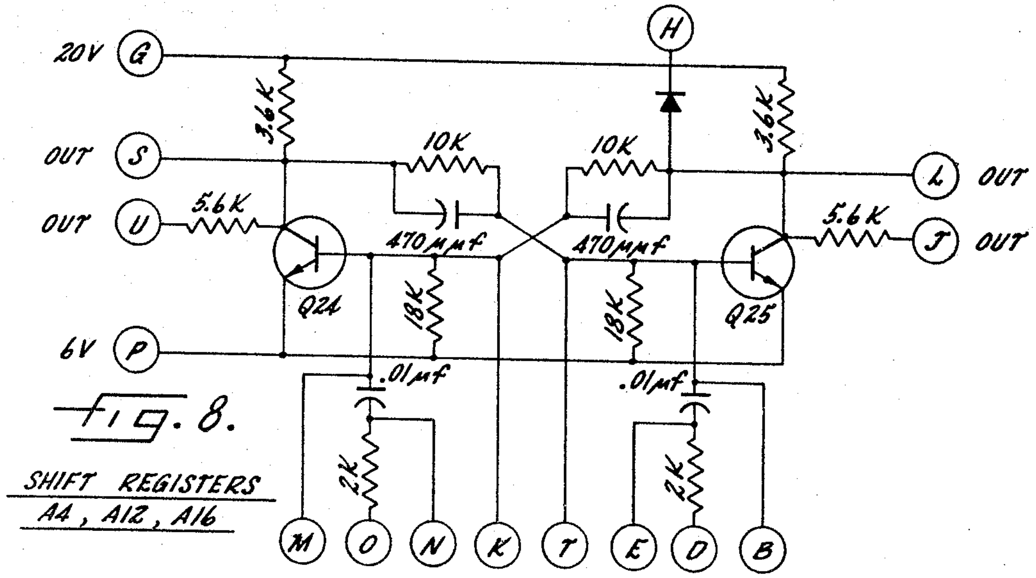
FIGURE 8 is a circuit schematic of one type shift register multivibrator shown in block in FIGURE 2.

*Figure 8*

The shift register modules A4, A12, and A16 are alike except for certain inputs and outputs, a circuit diagram of which is illustrated in FIGURE 8. Terminals of modules A4, A12, and A16 in FIGURE 2 correspond to the terminals of the shift register module shown in FIGURE 8. The application of the 300 ms. pulse to terminal K in FIGURE 8 places transistor Q24 into conduction setting this module to produce a low voltage on the output terminals S and U and a high voltage on the output terminals L and J for the duration of the 300 ms. pulse. However, as used in A12, a negative pulse applied from the inhibiting module A11 by way of conductor means 50 to terminals N and E will cause Q24 to cease conduction and Q25 to conduct. Alternate conduction of Q24 and Q25 is aided by the internal coupling of terminals J, B and U, M.

Figure 9:
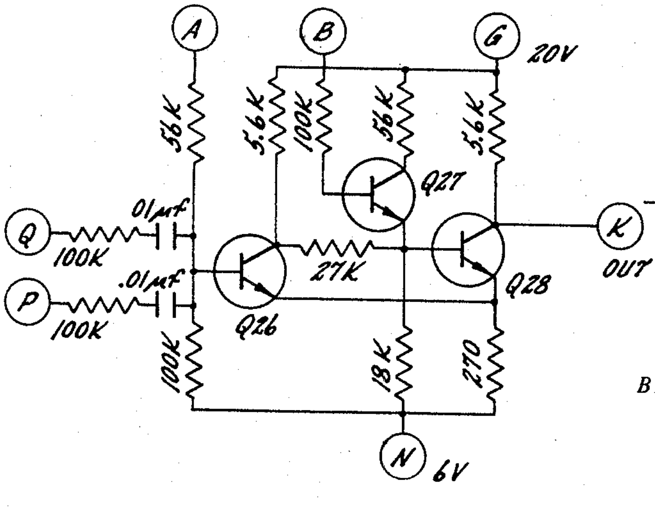
FIGURE 9 is a circuit schematic of a Schmitt inhibitor multivibrator shown in several blocks in FIGURE 2.

*Figure 9*

At the trailing edge of the 300 ms. positive pulse, the voltage is removed from the base of transistor Q7 cutting this transistor off and the setting voltage is removed from modules A4, A12, and A16. In like manner the collector voltage of transistors Q6 and Q7 coupled in common rises and is reflected by way of feedback 48 to place this voltage on the modules A2 and A11. The Schmitt inhibit modules A2 and A11 now receive a high voltage output from the collectors of transistors Q6 and Q7 by way of the feedback conductor 48 on their terminals Q which is applied to the base of a transistor Q26 as shown in FIGURE 9. This renders transistor Q26 conductive and places transistor Q28 in a nonconduction state producing a positive voltage output on terminal K, the collector terminal of transistor Q28. This positive output is blocked from terminal T of the module A3 by the diode 81 and is blocked by way of conductor 50 from the E and N terminals of the module A12 by the diode 102. The trailing edge of the 300 ms. signal is applied through the capacitor 79 and diode 80 to terminal T of the dot space multivibrator module A3. The module A3 is a one-shot multivibrator as shown in FIGURE 3 which is timed by the capacitor 86 and resistor 87 to establish an on-time equal to a dot space. The output terminal C of module A3 produces a positive pulse, the trailing edge (delayed the time interval of a dot space) of which is applied by way of conductor 49 through a coupling capacitor 88 and a diode 89 to the base of a transistor Q4. The base of transistor Q4 is biased by resistor 90 while the terminal junction of capacitor 88 and diode 89 is biased by a resistor 91. The negative pulse on the base of transistor Q4 places this transistor in conduction producing a voltage drop across the emitter resistor 92 which is applied by conductor means 93 to the O terminals of the shift register modules A4, A5, A6, and A7 and to the M terminal of a pulse steering multivibrator module A8. This produces the first shift in a serial readout of the binary number set into the sensor identification shift register modules A5, A6, and A7 which serially applies this readout to the pulse steering module A8. As each positive dot and dash Morse code signal is conducted out on conductor 47, the trailing edge thereof on feedback conductor 48 triggers the inhibit module A2. Each of the sensor identification shift register modules A5, A6, and A7 have terminals M and B coupled to the output terminals of the preceding shift register module with the first input being from the shift register control module A4, terminals O and D coupled to the conductor 93, terminal P coupled to the 6 volt source, terminal G coupled to the 20 volt source, terminal H of modules A5 and A6 coupled to the A terminal of the inhibit module A2 and the B terminal of modules A11 and A15, terminals U and J coupled as outputs to the input terminals M and B of the next adjacent shift register module and terminals K and T coupled to conductors 42 from the programmer 32.

Figure 10:
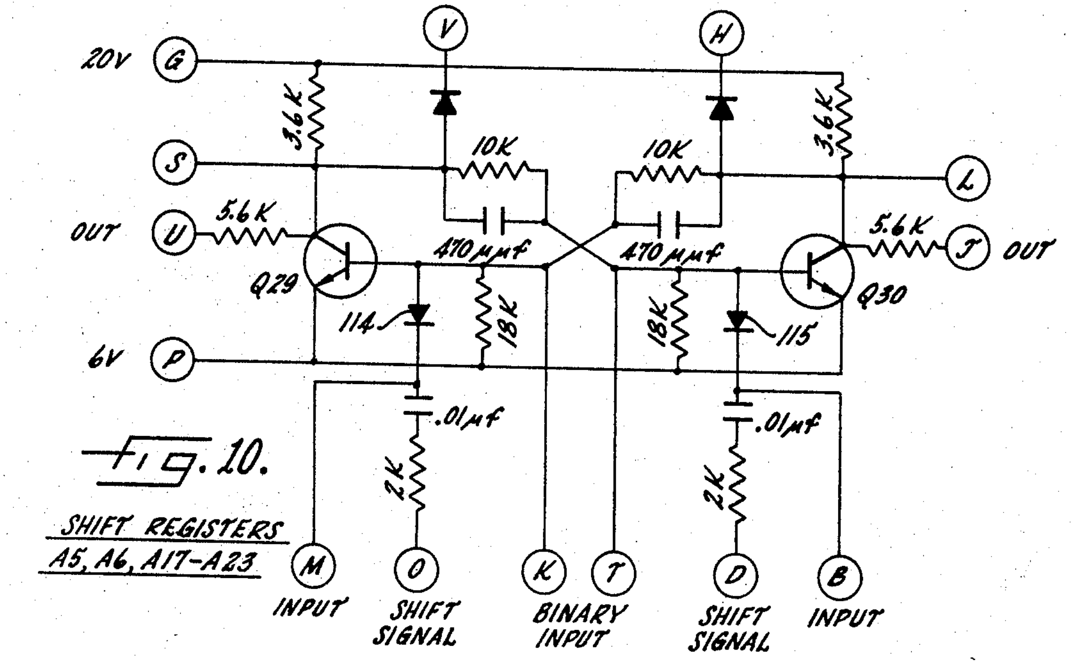
FIGURE 10 is a circuit schematic of another type of shift register multivibrator module shown in several blocks in FIGURE 2.

*Figure 10*

Modules A5 and A6 are shown in circuit schematic in FIGURE 10 in which like terminals appear as shown in FIGURES 2*a* and 2*b*. If the negative shift signal is applied over the conductor 93 to the terminals O and D, each preceding register, such as A5, will shift its contents on its outputs J and U, being "0" or a binary "1," depending on which of the transistors Q29 or Q30 is conductive, to the next succeeding module, such as A6. Accordingly, the binary "0" or "1" from the module A5 will be shifted into module A6 and a binary of "0" or "1" from module A6 will be shifted into module A7, the shift end multivibrator module as shown in FIGURE 11.

Figures 11, 12:
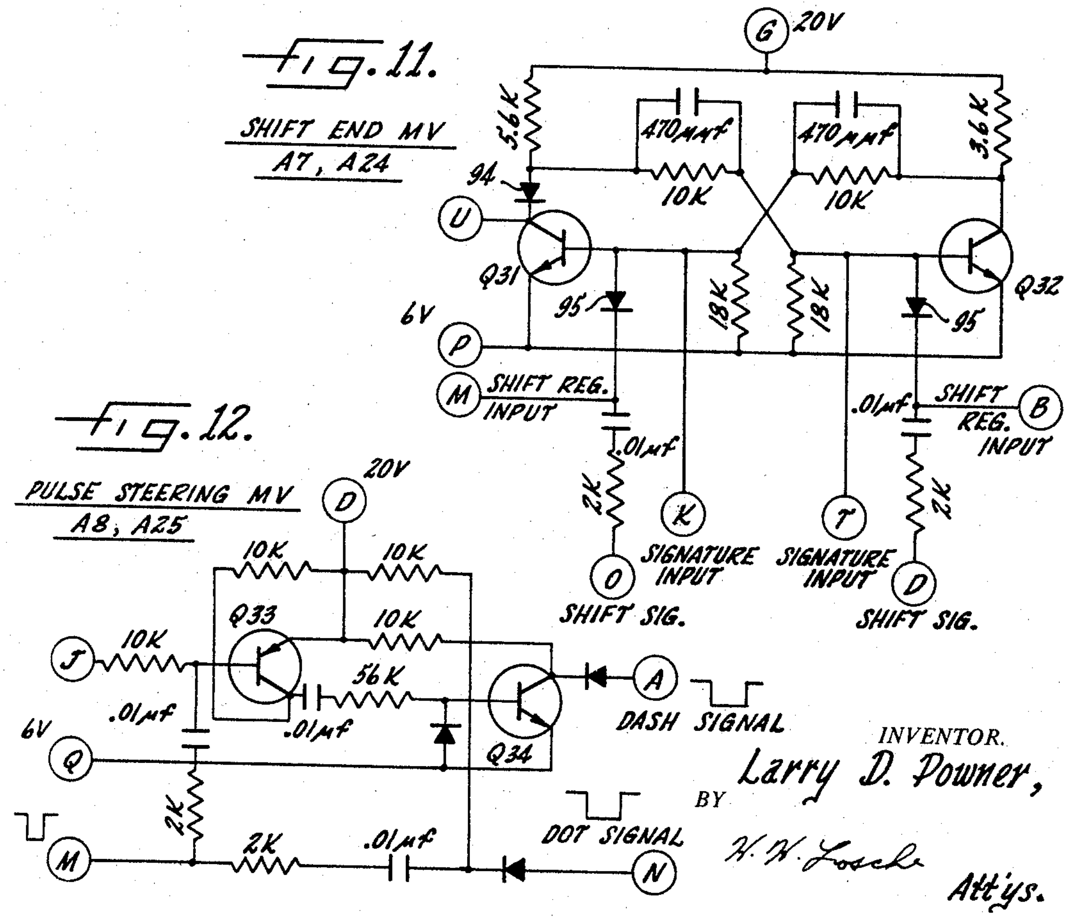
FIGURE 11 is a circuit schematic of a shift and multivibrator module shown in two different blocks in FIGURE 2.
FIGURE 12 is a circuit schematic of a pulse steering multivibrator module shown in two different blocks in FIGURE 2.

*Figure 11*

The shift end multivibrator module A7 in FIGURE 11 is constructed similarly to the shift register modules A5 and A6 except for the placement of a diode 94 in the collector circuit of the transistor Q31 and diodes 95 in the base circuits of transistors Q31 and Q32. The output terminal U taken from the collector of transistor Q31 will provide a serial readout of the three bits of binary information originally placed in the sensor identification shift register A5, A6, and A7 by way of the conductors 42 from the programmer 32. The serial readout from the terminal U of the shift and multivibrator module A7 is applied to the J terminal input of the pulse steering module A8. The pulse steering module has a terminal Q coupled to the 6 volt source, terminal M coupled to the shift pulse conductor 93, as hereinbefore stated, terminal D coupled to the 20 volt source, and output terminals A and N.

*Figure 12*

The pulse steering module A8 is shown in circuit schematic in FIGURE 12 having like terminals with that shown in the block module of A8, FIGURE 2*a*. When a binary "1" exists on the output terminal U of the shift end module A7 representative of a dot, this voltage will be applied to the J terminal of the pulse steering module A8 as shown in FIGURE 12. Since a dot pulse is represented by a high voltage and a dash pulse is represented by a substantially "0" voltage on the output terminal U of A7 and on the input terminal J of module A8, the high voltage representative of the dot pulse on the base of PNP transistor Q33 holds this transistor cut off since the base and emitter are substantially at the same voltage. When the dot space module A3 produces a pulse to place transistor Q4 into conduction by the trailing edge of this pulse to produce the shift register pulse, this shift pulse is a negative pulse applied to terminal M of the module A8 in FIGURE 12. This negative pulse is ineffective on the base of transistor Q33 and consequently there will be no output on terminal A. However, the negative shift pulse on terminal M is applicable through resistor, capacitor, and diode in series to output terminal N to produce a negative dot pulse on terminal N that is applied to terminal T of the dot multivibrator module A10. On the other hand, if a binary "0" is present on the terminal J of the pulse steering module A8 from the shift end register module A7, terminal U, the bias on the base of transistor Q33 is lower than for a dot pulse but not sufficient to place transistor Q33 into conduction. Upon the negative shift pulse being applied to terminal M, the base voltage of transistor Q33 will be reduced sufficiently to place transistor Q33 into conduction placing an increased bias on the base of the NPN transistor Q34 readily placing this transistor into conduction reducing its collector voltage thereby producing a negative pulse on the output terminal A. This negative pulse on the output terminal A is applied to terminal T of the dash multivibrator module A9. While a dot pulse may also appear on output N, it will be completely overshadowed by the dash pulse.

Referring again to FIGURE 3, the dot and dash multivibrator modules A10 and A9, respectively, are of the same construction as the one-shot multivibrator of modules A1 and A3 as shown in FIGURE 3. Accordingly, with reference to FIGURE 3, when a negative pulse is applied to terminal T, a positive pulse will appear on the output terminal C. The time interval difference in the output of modules A9 and A10 are provided as shown in FIGURE 2*a* by the capacitor 96 and resistor 97 connected to terminals V and C of module A9 and the capacitor 98 and resistor 99 coupled to the terminals V and C of module A10. The time constant established by the capacitor 96 and resistor 97 for the module A9 is three times the time interval established by the capacitor 98 and resistor 99 of module A10. In this manner the output from terminal C of module A9 is of the time duration equal to that of a Morse code dash while the output of terminal C for the module A10 is equivalent in time to the Morse code dot. Terminal C of modules A9 and A10 are coupled in common to the base of an inverter transistor Q5, the collector of which is directly coupled to the base of transistor Q6, this common coupling of the collector and base being through a load resistor 100 to the 20 volt source. Transistor Q6 is normally biased in a conductive state through resistor 100 which normally provides a substantially zero voltage on the Morse code output 47 and also providing the inhibit signal for the inhibit module A2 and A11 after the inhibit signal produced by the 300 ms. signal on the base of transistor Q7 has terminated. When a positive dash pulse is applied to the base of transistor Q5 from the module A9, Q5 is placed into conduction reducing the voltage on the base of transistor Q6 rendering it nonconductive causing the collector voltage to rise thereby producing a positive Morse code dash keying voltage on the output 47. In like manner, any dot positive pulse from the module A10 will be operative to render transistor Q5 conductive and Q6 nonconductive for the time interval of the dot pulse thereby producing a positive Morse code dot pulse on the output 47. Each dot or dash Morse code positive pulse on the output 47 is fed back through the conductor 48 to make effective the trailing edge on inhibit modules A2 and A11 in which the module A2 signals the dot spacing module A3 to produce a space in accordance with its time constant established by capacitor 86 and resistor 87 to place a dot space between each binary "0" or "1" readout of the sensor identification shift register A5 through A7, as described, supra.

As stated hereinabove, when the trailing edge of the 300 ms. signal produced by the module A1 is applied from the emitter output of transistor Q1 over the conductor 41 and the output of the emitter of transistor Q2 over the conductor 68 to cause the digital counter consisting of the modules A29 through A36 to dump or transfer its digital count into the analog-to-digital shift register consisting of modules A17 through A24, the shift register A17 through A24 is ready for readout. It is repeated that, during this 300 ms. signal from module A1, the sensor identification has been read into the shift register A5 through A7 and upon the occurrence of the trailing edge of the 300 ms. signal, readout of the sensor identification shift register first takes place. While the sensor identification shift register is being read out, the inhibit module A11, together with the existence of signal output on one of the H terminals of A4, A5, and A6 to the B terminal of A11 and A15, inhibits readout of the analog-to-digital shift register A17 through A24. The inhibit multivibrator module A11 is the same as that explained for the inhibit module A2 having a Q terminal coupled to the feedback conductor 48, a G terminal coupled to the 20 volt source, a B terminal coupled in common with B terminal of the shift inhibitor module A15 as well as the A terminal of the first inhibitor module A2. A terminal N is coupled to the 6 volt source, terminal K is the output terminal, and terminal A is coupled to the A terminal of the inhibit module A15 and in parallel to the H terminal of the shift register modules A16 through A23. As long as Morse code pulses are produced on the Morse code output 47 of the sensor identification register A5 through A7, the inhibit circuits A11 and A15 inhibit the readout of shift register A17 through A24.

When the Morse code readout for the sensor identification register is finished, the trailing edge drop of the last Morse code positive pulse output to substantially 0 voltage on terminal Q of module A11 produces a negative output voltage on terminal K which is coupled through a capacitor 101 and a diode 102 in common to terminals E and N of the spacing control module A12. It may be noted that module A12 has been set in one of its states so that the first pulse on terminals E and N will apply a negative signal through the series coupling of a resistor 103, capacitor 104, and diode 105 to a terminal T of the dash space module A14. The next pulse from the inhibit module A11 (resulting from the last Morse code output on 47) to terminals E and N of the space control module A12 will produce an output through the series connection of the resistance 106, capacitor 107, and diode 108 to the terminal T of the dot space module A13. Module A12 produces these outputs on terminals S anl L with terminals U and M coupled in common and the terminals J and B coupled in common to effectuate alternate signal outputs. Module A12 is a multivibrator circuit shown in schematic circuit diagram in FIGURE 8 and is the same as the module A4 except for the inter terminal couplings, as hereinabove stated.

Referring more particularly to FIGURE 8, the 300 ms. positive pulse is applied to terminal T in module A12 (distinct from the application of this 300 ms. pulse to terminal K in module A4) to place transistor Q25 into conduction. This will produce a low voltage output on terminal L and a high voltage output on terminal S. Upon the application of the first negative pulse to terminals E and N, the transistors Q24 and Q25 will switch conduction. Since transistor Q25 was in a conducting state, this transistor will be cut off and transistor Q24 will be placed in conduction thereby producing a negative pulse on the output terminals S to the input terminal T of the dash space module A14. The positive pulse on the output terminal L of module A12 is blocked by the diode 108 from reaching terminal T of the dot space module A13. The second negative pulse in succession by way of conductor 50 from the inhibit module A11 to the terminals N and E in common of the space control module A12 will again switch conduction from transistor Q24 to transistor Q25 producing a negative output pulse on terminal L to terminal T of the dot space module A13, a positive output on terminal S of A12 being blocked by the diode 105.

The dot space time interval of the dot space module A13 is established by the capacitor 109 and the resistor 110 while the time interval of the dash space module A14 is controlled by the time constant established by the capacitor 111 and resistor 112 to terminals C and V of modules A13 and A14. The dot and dash space modules A13 and A14 are constructed the same as modules A1, A3, A9, and A10 as shown in FIGURE 3. Whenever a negative pulse arrives at terminal T, as shown in FIGURE 3, the conduction of transistors Q9 and Q10 are controlled to produce the positive output pulse on terminal C and the time of duration of this positive pulse on the output terminal C is controlled by capacitor 109, and resistor 110, for module A13, and capacitor 111, and resistor 112 for module A14, as hereinabove stated. Transistor Q11 assists in producing sharp leading and trailing edges on the output terminal C. The output terminal C of the dot space module A13 is applied to terminal P of the shift inhibit module A15 while the output terminal C of the dash space module A14 is applied to terminal Q of the shift inhibit module A15.

The shift inhibit module A15 has a terminal N coupled to the 6 volt voltage, a terminal G coupled to the 20 volt source, terminal A coupled in parallel to the H terminal of the shift register modules A16 through A23, and the B terminal coupled in common to the B terminal of the inhibit module A11 as well as the A terminal of module A2 and the H terminals of the shift register modules A4 through A6. An output terminal K is coupled directly to the base of the PNP transistor Q8 having its emitter coupled to the 20 volt source through a load resistor 113 and its emitter also coupled in parallel to the O terminal of module A16, the O and D terminals of the shift register modules A16 through A24, and the M terminal of the pulse steering module A25.

Referring to FIGURE 9 showing the schematic of the shift inhibit module A15, whenever the trailing edge of either a positive dash space or dot space is applied to terminals Q and P, transistor Q26 will be cut off which raises the potential on the base of transistor Q28 turning this transistor on producing a voltage drop on the collector output K to the base of transistor Q8 delayed by the length of time established by either the dot or the dash time interval. Also, whenever positive potential appears on terminal B resulting from any of the sensor identification shift register modules A4 through A6 being in a "1" state, transistor Q27 is placed into conduction which will again place transistor Q28 into conduction to hold the output voltage K negative thereby holding transistor Q8 on. Terminal B provides the input to inhibit readout of the shift register A17 through A24 while readout is being made of the sensor identification shift register A5 through A7. Referring again to the dot and dash signals produced by the dot space module A13 and the dash space module A14 to the shift inhibit module A15, transistor Q8 will be rendered conductive at the end of the dot or the dash timing interval to apply negative pulses in common to the terminals O and D of the shift register modules A17 through A24 to cause this register to shift at the end of each dot or dash spacing signal. The shift register module A16 is constructed as shown in FIGURE 8 and described hereinbefore, while shift registers A17 through A23 are constructed in a manner shown by FIGURE 10, described hereinbefore. The pulse end module A24 is constructed as shown in FIGURE 11 and the pulse steering module A25 is constructed as shown in FIGURE 12, described hereinbefore. FIGURES 8 and 10 are quite similar except for the diodes 114 and 115 in the input circuit to the bases of transistors Q29 and Q30 in FIGURE 10. The shift register module A16 provides a control for the shift register module A17 through A23 and as hereinbefore stated was present in one of its states by the positive 300 ms. signal to terminal K through the resistor 75 and diode 76 from the conductor 41. The first dot or dash pulse then applied to terminal O of module A16, as shown in FIGURE 8, will cut off transistor Q24 to cause conduction of transistor Q25 in which the output J will produce a negative output voltage while the output terminal U will produce a positive output voltage. Accordingly, module A16 will produce an output U a positive voltage which is applicable to terminal B of module A17 while the output terminal J of module A16 will produce a negative signal applied to terminal M of module A17. Referring to modules A17 through A23, the circuit for which is shown in FIGURE 10, each preceding modules having a "1" or a "0" therein will be transferred to the next higher module through terminals JM and UB whenever the space pulse or shift signal is applied from the emitter of transistor Q8 to the input terminals O and D of these modules A17 through A23. As is well understood by those skilled in the art, as illustrated by FIGURE 10, any negative space signal or shift signal applied to O and D will cause a readout or shift of the "0" or "1" binary information in that module to the next higher module to cause a shift of the preceding module of that binary information to the next higher module. Consequently, as the dash and dot inhibit signals are applied to the transistor Q8 from A14 and A13 in an alternate sequence, the shift registers A17 through A24 will be read out to the pulse steering module A25. The shift end module A24, as shown in FIGURE 11, is similar to the modules shown in FIGURES 8 and 10 except that the signal output at terminal U serially reads out the binary "1's" and "0's" as they are shifted down the register from modules A17 through A23.

Referring to FIGURE 11, whenever a binary "1" appears in the preceding register module A24 upon either the M or B inputs from the output J or U of module A23, this module A24 will be set in accordance with that binary "1" or "0" serially read out. If a binary "1" (negative pulse) appears on the M terminal of module A24 to cause cutoff of transistor Q31, the binary "1" voltage output will appear on output terminal U and transistor Q32 will be conducting. On the other hand, if a binary "1" (negative pulse) appears on terminal B producing a near zero voltage on input M, Q31 will be rendered conducting and Q32 nonconducting providing a binary "0" output on terminal U.

Referring again to FIGURE 12, which is a circuit diagram of the pulse steering module A25, the input terminal J receives the output of module A24 to steer dot signals over the output N to the input T of a dot module A10 and to steer dash signals over the output A of A25 to terminal T of the dash module A9. It is repeated that each binary "1" constitutes a dot signal while each binary "0" constitutes a dash signal. Accordingly when a dot signal (binary "1") is received on terminal J, as in FIGURE 12, having a high voltage, transistor Q33, being normally nonconductive, will remain nonconductive since the base and emitter thereof are substantially equal. Accordingly, when the negative shift signal from transistor Q8 is applied to terminal M of module A25, this signal will be conducted through the resistor, capacitor, and diode to terminal N for conduction from output N terminal of A25 to the T terminal of A10. This will produce a dot signal over the Morse code output 47, as hereinbefore described. In like manner when a dash signal (low voltage "0" binary signal) is received at terminal J on the pulse steering module A25, this will lower the base voltage to a point just above the voltage necessary to render transistor Q33 conductive. Upon the application of the negative shift or spacing pulse at terminal M, transistor Q33 will be rendered conductive immediately placing transistor Q34 into conduction reducing the collector voltage to produce a negative voltage pulse output on terminal A applied to terminal T of the dash module A9 to produce a Morse code dash output on the output 47 as hereinabove described for the sensor identification shift register output signals. Accordingly, the binary word placed in the shift register A17 through A24 from the digital readout A29 through A36 will be serially read out in a Morse code sequence on the Morse code output 47 with a dot space between the first two digitally read out binary signals and again between the third and fourth, between the fifth and sixth, and between the seventh and eighth binary numbers. In like manner a dash space will be placed between the second and third, the fourth and fifth, and the sixth and seventh binary numbers readout since the dot and dash space multivibrator A13 and A14 alternately place a dot and dash between binary numbers read out of the modules A17 through A24, starting with a dash space following sensor identification shift register readout. This readout places the eight digits of the binary shift register A17 through A24 in pairs, each pair constituting a Morse code letter, A, I, M, or N.

OPERATION

Let it be assumed for the purpose of example hereinbefore given in the description of this invention, that the invention shown and described for FIGURES 2*a* and 2*b* and related figures is for a weather station having a plurality of weather sensor devices coupled to the programmer 32 by way of inputs 26 through 31, as shown in FIGURE 1. The programmer 32 will, at timed intervals, throw switches to power the circuit of FIGURES 2*a* and 2*b* as well as the weather sensors and a radio transmitter coupled to the Morse code output 47. To start readout of the weather sensing devices, the programmer initiates a negative start pulse applied on its output 34 to the start and timing control circuit 35, consisting of the module A1 and transistors Q1, Q2, and Q3. Module A1 is timed by capacitor 64 and resistor 63 to produce a positive output pulse for a duration of 300 ms. This 300 ms. output pulse conditions transistor Q1 to switch a 20 volt, 300 ms. pulse over output 41 to set modules A16, A12, and A4. This pulse over the conductor 41 also biases transistor Q7 placing it in conduction to produce a zero voltage on the Morse code output 47 which is fed back by conductor 48 to operate inhibit modules A2 and A11. This 300 ms. output signal over conductor 41 is applied likewise to the programmer 32 to cause the programmer to switch the binary identification signature signals for the weather sensor first to be transmitted. For example, if the water temperature sensor 20 is first thrown into circuit by the programmer placing the water temperature analog voltage on the output 33 as one input to the module A26, terminal K, this sensor identification signature, consisting of three bits of binary information, will be dumped or transferred by conductors 42 into the sensor identification shift register SR–1 consisting of modules A5 through A7. The 300 ms. on the output of module A1 is applied to transistor Q3 to produce a voltage on its output coupled in common to the V terminals of the shift register SR–2, consisting of modules A29 through A36, to reset each of these modules to the "0" state. A1 also produces on the output R a voltage bias on the multivibrator module A28 to start it in its free running state producing pulses on its output 37 which are added in the digital counter A29 through A36 until the voltage output on conductor 40 of the voltage ladder 39 equals the sensor voltage input over conductor 33 at which time module A26 trips module A27 to remove the bias from module A28 thereby stopping the count. The count in the digital counter should be completed within the 300 ms. signal output of A1 so that the analog voltage of the sensor input is now converted to a digital word in the digital counter A29 through A36. If for any reason the digital counter A29 through A36 goes to a maximum count, the voltage on the O terminals coupling the K terminal of A27 will trigger A27 to stop the free running multivibrator module A28.

The trailing edge of the 300 ms. signal is operative on transistor Q2 to produce a voltage signal from its emitter output to terminals S of the digital counter A29 through A36 to cause the digital counter to dump or transfer its count into the shift register A17 through A24. At the same time, cutoff of module A1 will produce a trailing edge of the positive 300 ms. signal on output 41 removing this signal from the programmer 32 to block any further sensor identification output on conductors 42 and will produce an input signal to terminal T of dot space module A3 while at the same time removing the positive voltage at terminal K of modules A4 and A16 and of terminal T of module A12. Operation of module A3 causes an output in the operation of transistor Q4 to initiate readout of the sensor identification shift register A5 through A7 as hereinbefore stated. The Morse code positive pulses on output 47 is fed back by 48 to shift and space each binary readout. The pulse steering module A8 steers all binary "1" signals to the module A10 and all "0" binary signals to the module A9. Modules A10 and A9 therefore produce pulses of the proper time duration to produce dot and dash pulses at Morse code output 47 in accordance with the binary "1" and "0" readout of the sensor identification shift register. The readout of the sensor identification shift register will produce a combination of three dots and dashes, the order or combination of which establishes a Morse code letter providing the signature or identification of the condition measuring sensor selected, herein given for example as the water temperature sensor 20, on the Morse code output 47. When the combination of this Morse code output of three bits is completed, the inhibit established by any information in the sensor identification shift register is removed from terminal B of modules A11 and A15 to allow readout of the eight bits of the shift register consisting of modules A17 through A24. The output from the Morse code conductor 47, by way of feedback 48 to the inhibit module A11, activates the spacing control module A12 to first cause a dash space to follow the Morse code signature letter. A readout of the first binary output in the module A24 through the pulse steering module A25 to the proper dot or dash module A10 or A9 then causes A11, A12, A13 to place a dot after this first binary number readout in series from this module A24. The dot and dash space modules A13 and A14 continue in this alternate sequence until all binary bits have been serially read out of the shift register A17 through A24. Morse code output on 47 will then appear finally as a series combination of three dots and dashes separated by dot spaces establishing a signature letter in Morse code for the sensor selected followed by four pairs of dot and dash combinations separating the bits by a dot space and the pairs by a dash space, each dot and dash combination establishing a Morse code letter to provide a signature letter followed by four Morse code letters. This signature Morse code letter identifies the sensor while the four following Morse code letters establish the sensor information, as in this case of water temperature, in accordance with the coding conversion chart given, supra.

After complete readout of the sensor signature letter and the four Morse code letters of the water temperature, the programmer will switch to produce a new start pulse over the output 34 of the sensor selected. For example, air temperature from the air temperature sensor 21 and the analog voltage from sensor 21 will now be conducted over the output conductor 33, as in the prior example. The generation of the 300 ms. signal will cause the programmer to produce the three binary bits for a sensor identification over the output conductors 42 to the sensor identification shift register for conversion into Morse code. The digital counter will count until its resistance ladder output equals the analog voltage of the sensor and transfer this digital count into the shift register, as described hereinabove, for readout in Morse code. The programmer timed by a master timer will select the weather sensors 20 through 25 in this continuing sequence until all weather information from the several sensors has been transmitted in Morse code at which time the programmer will shut down by switching off all supply voltages except the voltage to the master timer. The Morse code output 47 is adapted to be coupled to the keying circuit of the transmitter so that the transmitter will transmit signals in dot and dash Morse code for reception by any receiver tuned to the frequency of the transmitter.

While many modifications and changes may be made in the constructional details and features of this invention to adapt same for readout of other condition measuring devices other than weather information, and while other voltages and values may be given to the various circuit components to produce variations in the operational results to other desired applications of the converter, it is to be understood that I desire to be limited in the spirit of my invention only by the scope of the appended claims. It is to be understood that the eight binary digits used to provide four Morse code letters is by way of example only and any number of binary digits may be used, in pairs for a Morse code letter, in triplets for a Morse code letter, or in any combination to provide analog voltage to digital or binary to Morse code conversion. It may also be understood that a part of the circuitry could be eliminated, as by the elimination of the analog to binary computer of modules A26 through A36, where code wheel signals could place binary words directly into the register SR-2.

The invention described herein may be manufactured and used by or for the Government of the United States of America for governmental purposes without the payment of any royalties thereon or therefor.

I claim:

1. An analog to binary to Morse code converter comprising:

a digital counter having parallel outputs;

a free-running multivibrator having an output coupled to said digital counter to count the pulses from said free-running multivibrator and having an input;

a resistance ladder having inputs coupled in parallel to the parallel outputs of said digital counter and having an output providing an analog voltage increasing directly proportional to the increase in digital count;

a trigger multivibrator having an output coupled to bias said free-running multivibrator in and out of the generation of pulses and having an input;

a differential amplifier having an input adapted to receive an analog voltage to be coded and another input coupled to the output of said resistance ladder and having an output coupled to control said trigger multivibrator to cause said free-running multivibrators to generate pulses until said analog voltage from said resistance ladder equals the analog voltage to be coded;

a digital shift register having inputs coupled in parallel to the outputs of said digital counter and having an output;

an inhibitor multivibrator having an output coupled to said digital shift register and an input;

a pair of one shot spacing multivibrators, one having a one shot pulse output three times that of the other, the outputs thereof being coupled to control said inhibit multivibrator to cause the bits in said shift register to shift down to readout on the output thereof in alternate sequence of a dot space and a dash space; and a code logic circuit including a pulse steering multivibrator having an input coupled to the output of said digital shift register and having two outputs and including a pair of one shot dot-dash signal multivibrators, one signal multivibrator of which produces an upper voltage level pulse equivalent in time to a Morse code dot signal and the other signal multivibrator of which produces an upper voltage level pulse equivalent in time to a Morse code dash signal, a dash signal being produced in said upper voltage level for each binary "0" readout of said digital shift register and a dot signal being produced in said upper voltage level for each binary "1" readout of said digital shift register, said input to said code logic circuit from said digital shift register being through said pulse steering multivibrator of two outputs, one output being coupled as an input to the one shot signal multivibrator producing a dot in Morse code and the other output being coupled as an input to the one shot signal multivibrator producing a dash in Morse code such that digital shift register readout of a binary "1" will produce a dot Morse code signal of said upper voltage level followed by a space determined by said pair of one shot spacing multivibrators and a digital shift register readout of a binary "0" will produce a dash Morse code signal of upper voltage level followed by a space determined by said pair of one shot spacing multivibrators, said output of said code logic circuit being coupled to said one shot spacing multivibrators to sequence said digital shift register bit readout with proper spacing whereby analog voltage information to be coded applied to said differential amplifier is converted to Morse code upper voltage level signals from said code logic circuit.

2. An analog to binary to Morse code converter as set forth in claim 1 wherein said code logic circuit includes a transistor switch with the collector and emitter coupled across a voltage source through a collector resistance and the outputs of said pair of one shot signal multivibrators coupled to the base, and the output of upper level and lower level voltages for said code logic circuit being coupled to said collector.

3. An analog to binary to Morse code converter for the transmission in Morse code signals from analog voltage signals of condition measuring sensors comprising:

a plurality of condition measuring sensors, each producing an analog voltage directly proportional to the condition measured;

a digital computer having a parallel bit output and an input;

a resistance ladder having a parallel input coupled to the parallel output of said digital computer and having an analog voltage output directly proportional to the digital count;

means comparing selected sensor analog voltage with said resistance ladder analog voltage including a differential amplifier, a trigger multivibrator, and a counter multivibrator in which said analog voltage of a selected sensor is compared with the analog voltage of said resistance ladder output to produce, upon equal signals, a signal to said trigger multivibrator to remove a bias on said counter multivibrator to cease producing pulses for digital count;

a digital shift register having a parallel input coupled in parallel to the parallel output of said digital computer to accept transfer of each bit of said final digital count and having an output to readout the digital count in sequence, said shift register being shifted to provide said serial readout by an inhibitor multivibrator coupled in parallel to all bit registers of said shift register, the interval of inhibit being controlled in said inhibit multivibrator by a pair of one shot multivibrators coupled thereto, one of said one shot multivibrators producing a one shot inhibit pulse concurrent in time with a Morse code dash and the other of said one shot multivibrators producing a one shot inhibit pulse concurrent in time with a Morse code dot, said pair of one shot multivibrators being alternately triggered to cause a dot space to appear between each two bits readout by the operation of said inhibit multivibrator and a dash space to appear after each pair of bits readout by the operation of said inhibit multivibrator, said pair of one shot multivibrators being controlled by a spacing control multivibrator triggered by the output of said code logic circuit coupled thereto;

a sensor identification means consisting of a shift register of three bits having a binary output to identify each sensor which is read out serially to produce a Morse code of a letter;

a code logic circuit including a dot and dash one shot multivibrator and a transistor having the emitter and collector terminals coupled across a voltage source through a collector resistor with each dot and dash multivibrator coupled to the base and the collector providing said code logic circuit output, said code logic circuit having inputs to said dot and dash one shot multivibrator from the output of said digital shift register and the output of said sensor identification means to produce Morse code voltage signals on an output thereof; and a programmer means coupled to each condition measuring sensor, said comparing means, and said sensor identification means to selectively apply analog voltage from the selected condition measuring sensor for conversion to Morse code preceded by a Morse code of the sensor selected whereby the Morse code information can be transmitted for remote reception.

4. An analog to binary to Morse code converter as set forth in claim 3 wherein said coupling of said digital shift register output to said code logic circuit includes a first shift end multivibrator and a first pulse steering multivibrator to sense each binary "1" readout of said digital shift register to activate said dot multivibrator in said code logic circuit and to sense each binary "0" readout of said digital shift register to activate said dash multivibrator in said code logic circuit.

5. An analog to binary to Morse code converter as set forth in claim 4 wherein said coupling of said sensor identification to said code logic circuit includes a second shift end multivibrator and a second pulse steering multivibrator to sense the readout of said sensor identification shift register of binary "0" and "1" to activate the dash multivibrator and the dot multivibrator, respectively, for Morse code identification of the sensor information being coded.

6. An analog to binary to Morse code converter for the transmission in Morse code signals from analog voltage signals of condition measuring sensors comprising:

a plurality of condition measuring sensors, each producing an analog voltage of an amplitude directly proportional to the condition measured;

a digital counter of a plurality of bits having a parallel bit output and an input to the bit of lowest significance;

a resistance ladder having a parallel input coupled to the parallel output of said digital counter and having an analog voltage amplitude output directly proportional to the digital count;

a differential amplifier having a first input coupled to receive an analog voltage from a selected sensor, a second input coupled to the output of said resistance ladder, and an output;

a trigger multivibrator and a counting multivibrator coupled, in that order, between said differential amplifier and said input to said digital counter to cause said digital counter to count the counter multivibrator pulses in said binary bits until said analog voltage amplitude from said resistance ladder equals the amplitude of the selected sensor analog voltage;

a digital shift register equal in number of bits to said plurality of bits in said digital counter having parallel inputs coupled in parallel to the parallel outputs of said digital counter and having an output to serially read out said shift register;

a spacing control multivibrator, a dot space and a dash space multivibrator coupled to the output of said spacing control multivibrator to alternately activate said dot and dash space multivibrators, and a first inhibit multivibrator coupled to the outputs of said dot and dash space multivibrators with an output coupled to all bits of said shift register to produce dot and dash spaces between alternate binary bits in said shift register readout;

a sensor identification shift register having a parallel input to the bits of said register and a serial output readout;

a code logic circuit including a dot one shot multivibrator and a dash one shot multivibrator, each having an input and outputs coupled in parallel to the base of an output transistor having the emitter and collector coupled across a voltage source through an emitter load resistor, an output of said code logic circuit being taken from said collector;

means coupling the output of said sensor identification shift register to said dot and dash multivibrators through a shift end multivibrator and a pulse steering multivibrator to cause each binary "1" bit serially read out of said sensor identification shift register to activate said dot multivibrator and to cause each binary "0" bit serially read out of said sensor identification shift register to activate said dash multivibrator to produce Morse code dot and dash voltage signals, respectively, on the collector output of said transistor;

means coupling the output of said digital shift register to said dot and dash one shot multivibrators in said code logic circuit through a second shift end multivibrator and a second pulse steering multivibrator to cause each binary "1" bit serially read out of said digital shift register to activate said dot multivibrator and to cause each binary "0" bit serially read out of said digital shift register to activate said dash multivibrator to produce Morse code dot and dash voltage signals, respectively, on the collector output of said transistor;

programmer means coupled to each condition measuring sensor, to said first input of said differential amplifier, and to said sensor identification shift register parallel input to program the application of sensor information thereto at separated intervals for each sensor; and inhibit means coupled to said sensor identification shift register, said spacing control multivibrator, and said differential amplifier to allow said digital counter to count simultaneously with the activation of said sensor identification shift register of the sensor selected to the inhibit operation of said digital shift register, to inhibit the readout of said digital shift register until the sensor identification shift register is read out and converted into Morse code, and to exhibit the readout of said sensor identification shift register when said digital shift register is read out and converted to Morse code following sensor identification shift register readout whereby each condition measuring sensor provides analog voltage information converted into Morse code preceded by Morse code sensor identification.

7. An analog to binary to Morse code converter as set forth in claim 6 wherein said sensor identification shift register is of three bits to provide three dot and dash Morse code signals of a Morse code letter and said digital shift register and digital counter are each of eight bits to provide four pairs of two bit Morse code signals for four Morse code letters.

8. An analog to binary to Morse code converter as set forth in claim 7 wherein said inhibit means are inhibit multivibrators.

9. An analog to binary to Morse code converter as set forth in claim 8 wherein said programmer means includes stepping switches to select said condition measuring sensors one at a time simultaneously with binary sensor identification voltage signals for setting said sensor identification shift register.

References Cited

UNITED STATES PATENTS

| | | | |
|---|---|---|---|
| 3,047,845 | 7/1962 | Hansson | 340—184 |
| 3,276,012 | 9/1966 | Secretan | 340—347 |
| 3,309,694 | 3/1967 | Fierston | 340—347 |

MAYNARD R. WILBUR, *Primary Examiner.*

MICHAEL K. WOLENSKY, *Assistant Examiner.*

U.S. Cl. X.R.

235—154